US012694715B2

(12) United States Patent
Shahid et al.

(10) Patent No.: US 12,694,715 B2
(45) Date of Patent: Jul. 28, 2026

(54) ACTION RECOGNITION SYSTEM AND METHOD

(71) Applicant: Centre for Intelligent Multidimensional Data Analysis Limited, Hong Kong (CN)

(72) Inventors: Ali Raza Shahid, Hong Kong (CN); Hong Yan, Hong Kong (CN); Xinqi Fan, Hong Kong (CN)

(73) Assignee: Centre for Intelligent Multidimensional Data Analysis Limmited, Hong Kong (HK)

( * ) Notice: Subject to any disclaimer, the term of this patent is extended or adjusted under 35 U.S.C. 154(b) by 958 days.

(21) Appl. No.: 17/943,343

(22) Filed: Sep. 13, 2022

(65) Prior Publication Data

US 2024/0096134 A1     Mar. 21, 2024

(51) Int. Cl.
| | |
|---|---|
| *G06V 40/20* | (2022.01) |
| *G06T 15/20* | (2011.01) |
| *G06T 17/20* | (2006.01) |

(52) U.S. Cl.
CPC .............. G06V 40/20 (2022.01); G06T 15/20 (2013.01); G06T 17/20 (2013.01)

(58) Field of Classification Search
CPC ......... G06T 15/20; G06T 17/20; G06V 10/82; G06V 20/64; G06V 2201/033; G06V 40/103; G06V 40/20
See application file for complete search history.

(56) References Cited

U.S. PATENT DOCUMENTS

2022/0189113 A1* 6/2022 Seo ........................... G06T 7/55

OTHER PUBLICATIONS

S. M. Yoon and A. Kuijper, "Human Action Recognition Using Segmented Skeletal Features," 2010 20th International Conference on Pattern Recognition, Istanbul, Turkey, 2010, pp. 3740-3743, doi: 10.1109/ICPR.2010.911. (Year: 2010).*
Shahid, Ali Raza, Mehmood Nawaz, and Xinqi Fan. "View-Adaptive Graph Neural Network for Action Recognition." Authorea Preprints. (Year: 2022).*
Shahid, Ali Raza; Nawaz, Mehmood; Yan, Hong; Fan, Xinqi (2022): View-Adaptive Graph Neural Network for Action Recognition. TechRxiv. Preprint. http://doi.org/10.36227/techrxiv.18318929.v1.

* cited by examiner

*Primary Examiner* — Michael J Vanchy, Jr.
(74) *Attorney, Agent, or Firm* — MOSER TABOADA

(57)     ABSTRACT

An action recognition system and method for recognising actions performed by a subject, the action recognition system comprising: a computing apparatus comprising a processor, a memory unit, wherein the memory unit comprises a non-transitory computer readable medium comprising computer executable instructions stored thereon that, upon execution of the instructions by the processor, the processor configured to: receiving one or more input images of a subject captured by an image capture device, generate a wire three dimensional (3D) skeletal model of the subject identified within the one or more input images, determine an observation viewpoint for each image, apply a transform to the skeletal model based on the identified viewpoint, process the skeletal model to identify an action.

10 Claims, 7 Drawing Sheets

ACTION RECOGNITION SYSTEM AND METHOD

TECHNICAL FIELD

The present invention relates to an action recognition system and method but not limited to an action recognition system and method for recognising actions performed by humans from processing images.

BACKGROUND

Computer vision has been used to analyse images of a subject, where the images are captured using cameras or video. Human action recognition using visual data has become more common in certain applications such as for example game interaction, virtual reality apps, surveillance systems. Currently, human actions are recognised using several different modalities. Most action recognition methods are based on RGB video data. Action recognition can be performed by processing the video data or received images. Action recognition can be used in several of the applications listed above.

Action recognition is commonly performed using 3D (three dimensional) skeleton joints on the human body. The human in the processed images or video stream is represented as a skeleton and this representation is robust in variations during the acquisition viewpoints and distractions in the surrounding area of the human body. Depth acquisition sensors, such as two or more RGB cameras, StereoLabs Zed2, RealSense and Kinect and advanced methods to detect humans with pose estimation of the human streamlines collection of 3D skeleton data. Machine learning models can be used to detect human actions using pose estimation algorithms. Neural networks are commonly used for action detection.

One issue in real world applications is the different viewpoints for human action recognition whilst recording the subject. FIGS. 1A and 1B illustrate various viewpoints of the subject. As shown in FIG. 1A, the subject is performing a thumbs up pose and skeleton (i.e., wire frame) representation of the subject is illustrated from different viewpoints. FIG. 1B shows the subject in a specific posture captured from three different viewpoints. FIG. 1B also illustrates the wire frame (i.e., skeleton) representation of the subject and the variations in the pose due to different viewpoints. The different viewpoints are camera locations and the view of the camera as it captures the subject. The variation due to different viewpoints makes action recognition challenging, since movement of the subject changes the viewpoint which adds variability to the captured images.

Further the varied samples i.e., images from different viewpoints may not be included in training datasets for neural networks used in action recognition causing a decrease in recognition performance. One common way to address this viewpoint variability issues is to use datasets with many parameters and very large datasets. However, such large datasets can be difficult to handle and training models e.g., neural networks with such large datasets can be time consuming, difficult, and often leads to the model being prone to overfitting.

One common approach to address view variation has been to pre-process captured images or video data by centring the skeletal body and aligning it to an axis. However, such an approach is not flexible enough to account for various real time situations e.g., using unmanned aerial vehicles (UAV) and surveillance cameras to capture videos or images of a subject. In such situations where the camera and human are moving relative to each other using the current practice of pre-processing or using large data sets for training either still does not account variation to provide a robust action recognition method or are too time consuming or resource intensive. Further such pre-processing strategies are not explicitly designed for action recognition and area based on priori information, limiting the space for utilising effective viewpoints.

SUMMARY OF THE INVENTION

The present invention relates to a system and method for recognising actions performed by a subject. The system and method are configured to receive images of the subject and process the images to recognise an action being performed by the subject. The images may be still pictures or video stream with multiple frames. The images are captured along with depth (3D) sensor device. The images are processed by a computing apparatus by applying an action recognition method. The computing apparatus may utilise a machine learning approach to identify and recognise an action being performed by a subject.

The present invention may describe the action recognition system and method for recognising human actions performed by a human subject. The invention as described herein may be suitably modified for recognising actions of an animal subject based on capturing video or images of the specific subject.

The present invention relates to an action recognition system and method for recognising and identifying actions performed by a human subject. The present invention relates to an action recognition system and method that accounts for view variation within images of a subject performing an action. The present invention removes the effects of view variation that results in an improved and more accurate system and method for recognising i.e., identifying actions being performed by a subject.

In accordance with a first aspect of the present invention, there is provided an action recognition system for recognising actions performed by a subject, the action recognition system comprising:

a computing apparatus comprising a processor, a memory unit, wherein the memory unit comprises a non-transitory computer readable medium comprising computer executable instructions stored thereon that, upon execution of the instructions by the processor, the processor configured to:

receiving one or more input images of a subject captured by an image capture device, generate a wire three dimensional (3D) skeletal model of the subject identified within the one or more input images, determine an observation viewpoint for each image, apply a transform to the skeletal model based on the identified viewpoint, process the skeletal model to identify an action.

In an embodiment of the first aspect, the processor is further configured to repeatedly, for each image of the one or more images, determine an observation viewpoint for each image and transform the skeletal model based on the identified viewpoint.

In an embodiment of the first aspect, the processor is configured apply a transformation function that defines parameters related to an optimal viewpoint.

In an embodiment of the first aspect, the transformation function, when executed by the processor, transforms each coordinate of the skeleton model and/or the coordinate system defining the position of the skeleton model, based on the transformation function, such that the skeleton model is arranged as viewed from an optimal viewpoint.

In an embodiment of the first aspect, the transformation function comprises a transformation matrix and a translation vector, the transformation matrix defines a plurality of transformation values, wherein at least one transformation value corresponds to a transformation of x coordinates of the skeleton model, at least one transformation value corresponds to a transformation of y coordinates of the skeleton model, and at least one transformation value that corresponds to a transformation value of z coordinates of the skeleton model.

In an embodiment of the first aspect the transformation function is defined as $$\mathcal{T}(=\mathcal{R}_x^{t,\alpha}, b_t)(\mathcal{R}_y^{t,\beta}, b_t)(\mathcal{R}_z^{t,\gamma}, b_t),$$

wherein x, y, z correspond to coordinate's, $\alpha$=radian coordinate transformation, $\beta$=radians of y coordinate transformation and $\gamma$=radians of z coordinate transformation, wherein transformation function defines the transformation for each image.

In an embodiment of the first aspect, the transformation matrix is defined as $$\mathcal{R}^t = \left[\mathcal{R}_x^{t,\alpha}, \mathcal{R}_y^{t,\beta}, \mathcal{R}_z^{t,\gamma}\right] \in \mathbb{R}^{3\times 3}$$

and wherein the translation vector is defined as $b \in \mathbb{R}^3$.

In an embodiment of the first aspect, each joint of the skeleton model in each image shares the same transformation parameters, wherein the transformation parameters are defined as $(\alpha, \beta, \gamma, b)$.

In an embodiment of the first aspect, the processor is configured to automatically learn an optimal viewpoint when the processor executes the step of determining an observation viewpoint; and the processor further configured to automatically learning and determining an observational viewpoint with the associated transformation parameters.

In an embodiment of the first aspect, the processor is configured to implement and execute a neural network, the neural network may be defined by the computer executable instructions stored in the memory unit, and wherein the neural network comprises a view adaption block, and the view adaption block is configured to apply an unsupervised learning algorithm as part of the step of learning an observation viewpoint with associated transformation parameters.

In an embodiment of the first aspect, the learning algorithm comprises applying a learning function to each of the received images.

In an embodiment of the first aspect, the learning algorithm comprises applying a learning function, the learning function comprises $$[\alpha_t, \beta_t, \gamma_t]^T = \mathcal{W}_r k_t^r + c_r,$$

wherein $\mathbb{R}_r \in \mathbb{R}^{3\times n}$ denotes the weight matrix, $$k_t^r \in \mathbb{R}^{n\times 1}$$

defines a vector for the linear layer of the output with n number of neurons within the neural network and $c_r \in \mathbb{R}^{3\times 1}$ defines an offset vector of the linear layer.

In an embodiment of the first aspect, the processor, as part of the step of processing a skeleton model to identify an action, is further configured to execute computer readable instructions causing the processor to perform the additional steps of:

converting the transformed skeleton model, of each image, into a graph representation, processing each graph representation to identify an action.

In an embodiment of the first aspect, the processor is configured to implement an adaptive convolution graph neural network, and wherein the steps of converting the transformed skeleton model into a graph representation and processing each graph representation is performed by an adaptive convolution graph neural network.

In an embodiment of the first aspect, the processor, as part of the step of converting the transformed skeleton into a graph representation, is further configured to execute computer readable instructions causing the processor to perform the additional steps of:

representing each set of joints of the skeleton model as a total number of nodes within the graph representation, applying a graph convolution to each node within the graph representation by:

transforming node representations to a learnable parameter matrix defined as $W_{\mathcal{G}_\delta} \in \mathbb{R}^{(l+1)\times l}$, and applying a nonlinear ReLU function ($\sigma$) to the transformed node representations;

processing each graph representation comprises identifying relationships between two or more nodes that represent joints in the skeleton model; and determining an action based on the relationship between two or more nodes.

In an embodiment of the first aspect, the convolution graph neural network further comprises:

at least a first adaptive convolution block, at least a second adaptive convolution block, wherein the first adaptive convolution block comprises at least a 2D convolution layer, a first batch normalisation layer, and a first rectified linear unit activation layer, a graph convolution block with 128 channels, wherein the graph convolution block with 128 channels is followed by a second batch normalisation layer and a second rectified linear unit activation layer, and;

wherein the second adaptive convolution block comprises at least a 2D convolution layer, a first batch normalisation layer, and a first rectified linear unit activation layer, a graph convolution block with 192 channels, wherein the graph convolution block with 192 channels is followed by a second batch normalisation layer and a second rectified linear unit activation layer.

In accordance with a second aspect of the present invention, there is provided a computer implemented action recognition method for recognising actions performed by a subject, the action recognition method is executed on a computing apparatus, the action recognition method comprising the steps of:

receiving, at the processor, one or more input images of a subject captured by an image capture device, processing, in a processor, the one or more input images by:

generating a wire three dimensional (3D) skeletal model of the subject identified within the one or more input images, determining an observation viewpoint for each image, applying a transform to the skeletal model based on the identified viewpoint, processing the skeletal model to identify an action.

In an embodiment of the second aspect, the step of determining an observation viewpoint for each image and transforming the skeletal model based on the identified viewpoint is performed repeatedly for each image in the one or more images.

In an embodiment of the second aspect, the step of applying a transform comprises applying a transformation function that defines parameters related to an optimal viewpoint.

In an embodiment of the second aspect, the transformation function transforms each coordinate of the skeleton model and/or the coordinate system defining the position of the skeleton model, based on the transformation function, such that the skeleton model is arranged as viewed from an optimal viewpoint.

In an embodiment of the second aspect, the transformation function comprises a transformation matrix and a translation vector, the transformation matrix defining a plurality of transformation values, wherein at least one transformation value corresponds to a transformation of x coordinates of the skeleton model, at least one transformation value corresponds to a transformation of y coordinates of the skeleton model, and at least one transformation value that corresponds to a transformation value of z coordinates of the skeleton model.

In an embodiment of the second aspect, the transformation function is defined as $$T = (\mathcal{R}_x^{t,\alpha}, b_t)(\mathcal{R}_y^{t,\beta}, b_t)(\mathcal{R}_z^{t,\gamma}, b_t),$$

wherein x, y, z correspond to coordinates, $\alpha$=radians of x coordinate transformation, $\beta$=radians of y coordinate transformation and $\Upsilon$=radians of z coordinate transformation, wherein transformation function defines the transformation for each image.

In an embodiment of the second aspect, the transformation matrix is defined as $$\mathcal{R}^t = [\mathcal{R}_x^{t,\alpha}, \mathcal{R}_y^{t,\beta}, \mathcal{R}_z^{t,\gamma}] \in \mathbb{R}^{3 \times 3}$$

and wherein the translation vector is defined as $b \in \mathbb{R}^3$.

In an embodiment of the second aspect, each joint of the skeleton model in each image share the same transformation parameters, wherein the transformation parameters are defined as $(\alpha, \beta, \gamma, b)$.

In an embodiment of the second aspect, the action recognition method comprises automatically learning an optimal viewpoint by the step of determining an observation viewpoint comprises automatically learning and determining an observational viewpoint with the associated transformation parameters.

In an embodiment of the second aspect, the transformation parameters are learned by applying an unsupervised learning algorithm.

In an embodiment of the second aspect, learning an observation viewpoint with associated transformation parameters are performed by a neural network that comprises a linear layer applying the unsupervised learning algorithm.

In an embodiment of the second aspect, the learning algorithm comprises applying a learning function to each of the received images.

In an embodiment of the second aspect, the learning algorithm comprises applying a learning function, the learning function comprises $$[\alpha_t, \beta_t, \gamma_t]^T = \mathcal{W}_r k_t^r + c_r,$$

wherein $\mathbb{R}_r \in \mathbb{R}^{3 \times n}$ denotes the weight matrix, $$k_t^r \in \mathbb{R}^{n \times 1}$$

defines a vector for the linear layer of the output with n number of neurons within the neural network and $c_r \in \mathbb{R}^{3 \times 1}$ defines an offset vector of the linear layer.

In an embodiment of the second aspect, the step of processing a skeleton model to identify an action comprises the steps of:

converting the transformed skeleton model, of each image, into a graph representation, processing each graph representation to identify an action.

In an embodiment of the second aspect, the steps of converting the transformed skeleton model into a graph representation and processing each graph representation is performed by an adaptive convolution graph neural network.

In an embodiment of the second aspect, the step of converting the transformed skeleton into a graph representation further comprises:

representing each set of joints of the skeleton model as a total number of nodes within the graph representation, applying a graph convolution to each node within the graph representation by:

transforming node representations to a learnable parameter matrix defined as $W_{\mathcal{G}_\delta} \in \mathbb{R}^{(l+1) \times l}$, and applying a nonlinear ReLU function ($\sigma$) to the transformed node representations;

processing each graph representation comprises identifying relationships between two or more nodes that represent joints in the skeleton model; and determining an action based on the relationship between two or more nodes.

The term "image(s)" defines a static image of a subject captured by an image capture device e.g., a camera. The term also defines and covers a frame of a video stream of a subject captured by an image capture device e.g., a camera. A video stream or a stream of images, comprises multiple frames, and each frame may be considered an image. The term frame and image may be used interchangeably within this specification.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENTS

Figure 1A:
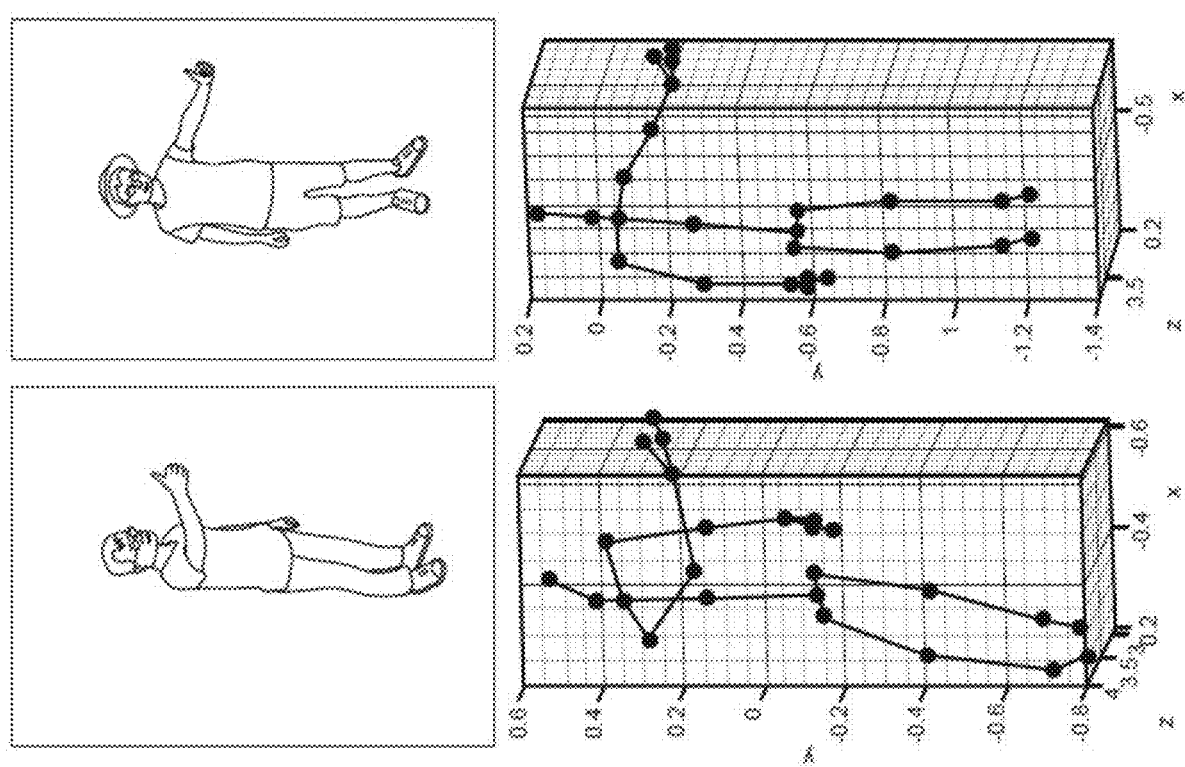
FIG. 1A illustrates various viewpoints of the subject and the variation in the image of the subject due to viewpoint variation.
Figure 1B:
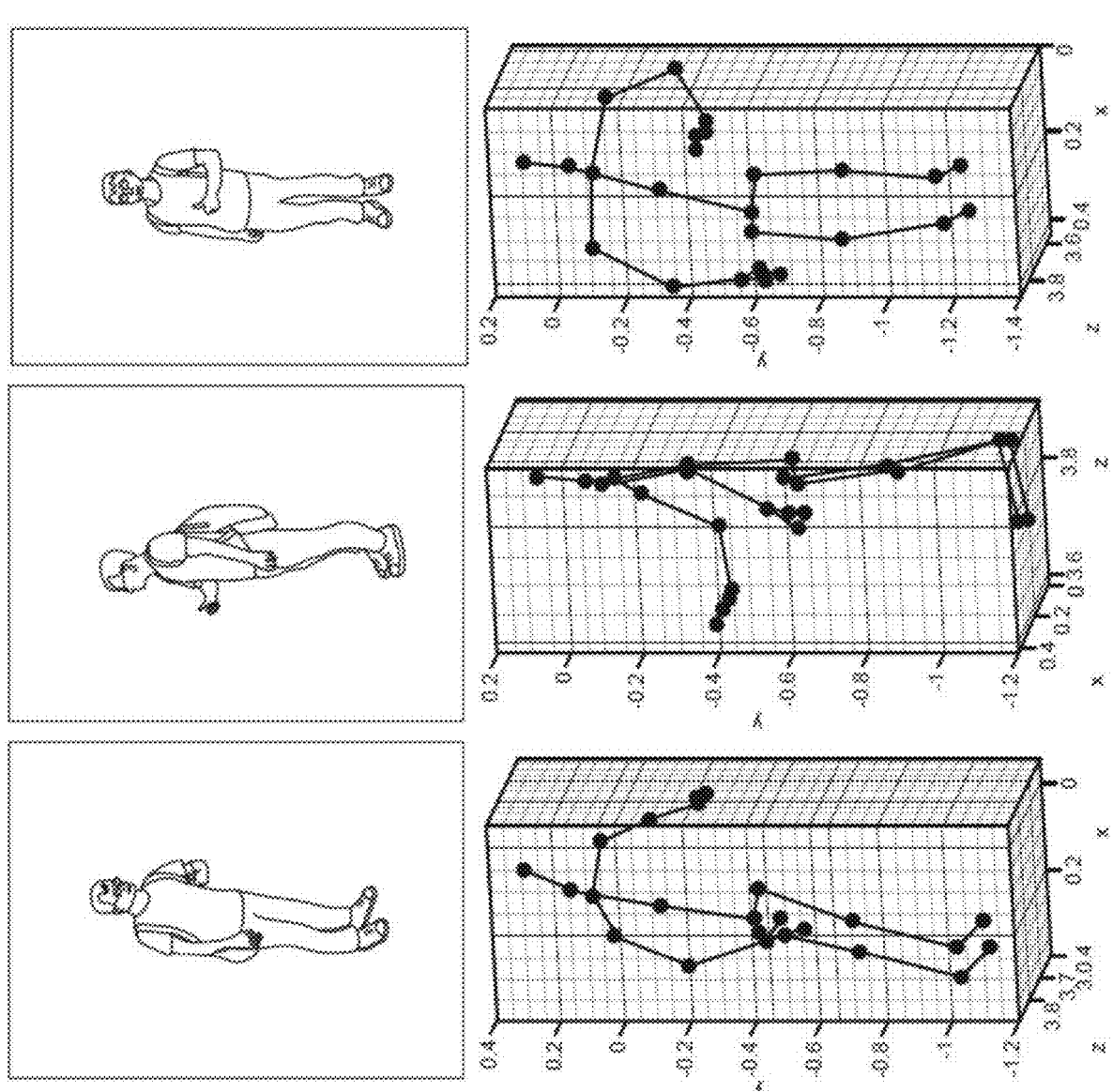
FIG. 1B illustrates other various viewpoints of the subject and the variation in the image of the subject due to viewpoint variation.

Action recognition is gaining popularity due to the popularity of three-dimensional (3D) acquisition sensors such as 3D cameras or other similar sensors. Existing approaches for action recognition rely on 3D skeleton data from video clips collected from several different views. The inventors have devised that a problem in recognising actions performed by a subject from video clips or images is the shift in perspective. In particular, the body view shifts from the camera perspective when humans perform certain actions, resulting in unstable and noisy data. This ultimately results in a reduced accuracy to identify and recognise actions performed by a subject. Most existing methods use fixed human defined prior criterion to reposition the skeleton and/or use complex pre-processing. The inventors have also determined that pre-processing strategies commonly used can help in reducing view variation but have several drawbacks such as for example, being time consuming, computationally complex, and reduced robustness to variations in the collected data. These strategies often cannot account well for various real time situations e.g., data collection by a UAV or surveillance cameras etc.

Human actions can be captured from any camera angles and the relative position of the subject to the camera changes as the subject performs actions. Several approaches have been developed for view-invariant action recognition for RGB based action recognition. These approaches are often either costly or cannot be directly extended for skeleton-based action recognition.

Skeleton based action recognition methods are more commonly used. These methods utilise complex pre-processing to account for view variation. Pre-processing often involves the skeleton being defined in relation to a centred orientation with body alignment using pre-processing methods. This affects the motion sequence of a subject performing an action, for example running action becomes running in the same place etc.

In one embodiment the present invention relates to an improved action recognition system and method that utilises a view adaptive neural network (i.e., a view adaptive mechanism) that identifies viewpoints across a sequence (i.e., over multiple images or across a video stream) and transforms the skeleton view to counteract the influence of view variation. The view adaptive network also comprises a further network that processes the adapted skeleton view to identify and recognise an action being performed. The recognition system comprises an action recognition engine implemented in a processor of a computing apparatus. The view adaptive neural network forms part of the action recognition engine.

The view adaptive network comprises at least The present invention relates to a computing apparatus that is configured to implement a view adaption block and a graph neural network in combination for improved action recognition while accounting for view variations. The current neural network model is configured to learn the best observed view and transforms the skeletons to the most appropriate view, and then applies an end-to-end recognition using the graph neural network to identify and recognise actions being performed by a subject. The present invention relates to an improved neural network architecture that is implemented on a computing apparatus that provides improved action recognition. The present invention also relates to an improve neural network architecture that includes dynamic view adjustment.

Advantageously, extensive experimental results demonstrate the present invention achieves improved action recognition. The present invention achieves at least state of the art performance on several leading databases with reduced parameters.

Figure 2:
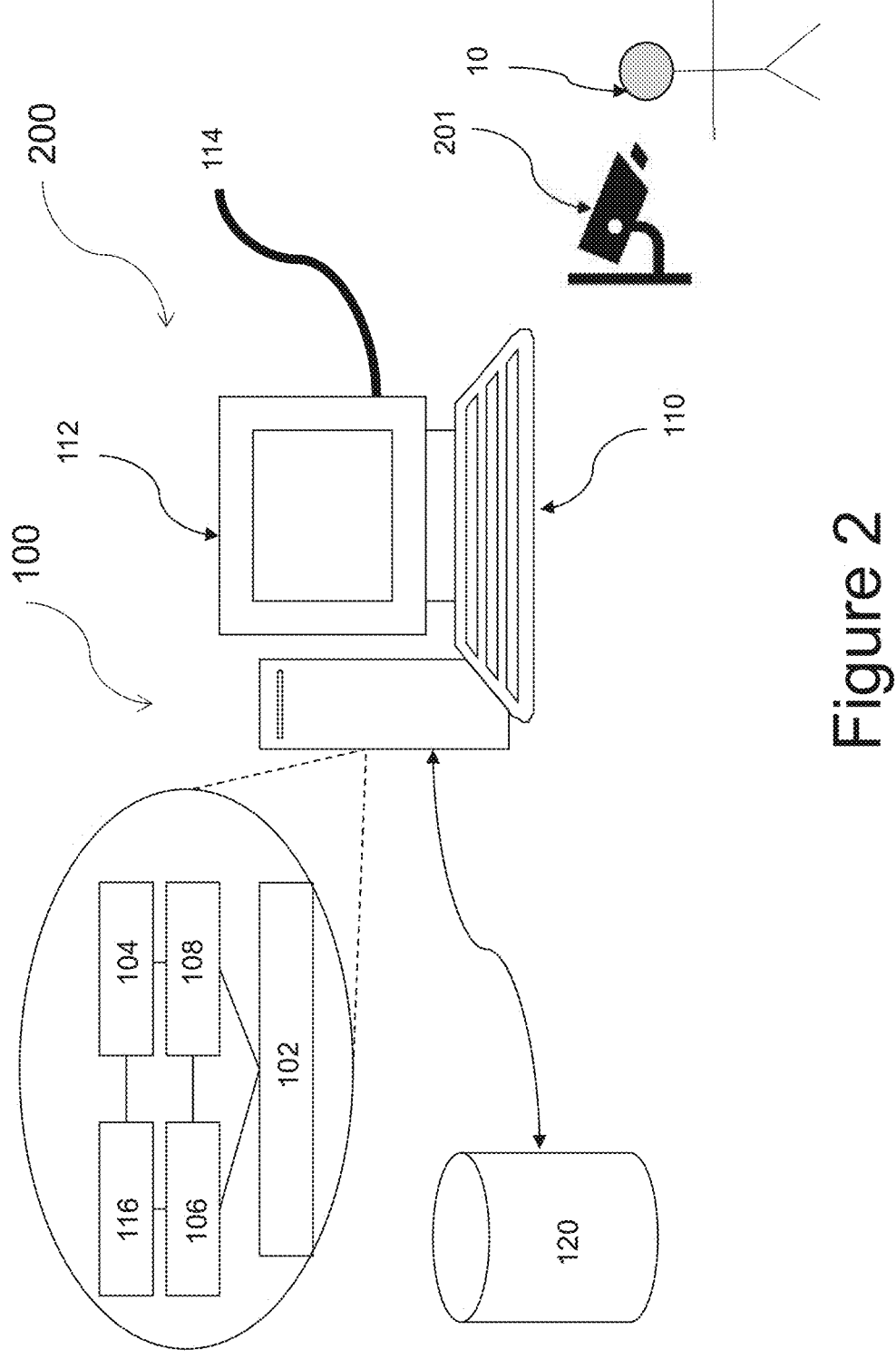
FIG. 2 is a schematic diagram of an action recognition system for identifying and recognising actions performed by a subject.

Referring to FIG. 2, an embodiment of the present invention is illustrated. FIG. 2 illustrates an embodiment of an action recognition system 200 for recognising actions performed by a subject. This embodiment is arranged to provide a system for recognising actions performed by a subject, the system comprising: a computing apparatus comprising a processor, a memory unit, wherein the memory unit comprises a non-transitory computer readable medium comprising computer executable instructions stored thereon that, upon execution of the instructions by the processor, the processor configured to: receive one or more input images of a subject captured by an image capture device, generate a wire three dimensional (3D) skeletal model of the subject identified within the one or more input images, determine an observation viewpoint for each image, apply a transform to the skeletal model based on the identified viewpoint, and; process the skeletal model to identify an action. The computing apparatus may further include an interface to receive images from an image capture device. The interface may be an image gateway or other suitable interface. The computing apparatus may also include a user interface to receive inputs and present information to a user.

The 3D skeletal model may be a 3D wire frame that is representative of a subject. The 3D skeletal model defines key joints and limbs of the subject.

The system further comprises an image capture device configured to capture one or more images of a subject performing an action. Preferably the image capture device captures multiple images, and the multiple images are processed by the computing apparatus to identify and recognise an action performed by a subject. Preferably the image capture device is configured to record a video stream of the subject, as the subject performs an action. The image capture device may be a camera or other suitable image capture device. The image capture device may be integrated into the computing apparatus or may be separate from the computing apparatus. The image capture device is configured to communicate with the computing apparatus and transmit captured images (or captured video) to the computing apparatus via a wired or wireless connection. The processor of the computing apparatus is configured to process the received images or video and recognise an action being performed.

In this example embodiment, the interface, memory and processor are implemented by a computer having an appropriate user interface. The computing apparatus may be implemented by any computing architecture, including portable computers, tablet computers, stand-alone Personal Computers (PCs), smart devices, Internet of Things (IOT) devices, edge computing devices, client/server architecture, "dumb" terminal/mainframe architecture, cloud-computing based architecture, or any other appropriate architecture. The computing device 100 (i.e., computing apparatus 100) may be appropriately programmed to implement the invention. In an embodiment the computing apparatus may be implemented as a mobile device e.g., a tablet or a smartphone. The image capture device may be integrated into the computing apparatus.

In this embodiment, the system and method are arranged to provide an improved system and method for recognising an action performed by the subject. The system comprises utilising an improved neural network architecture that is implemented by a computing apparatus. The neural network is configured to transform the skeleton of a subject based on an identified viewpoint. The identified viewpoint may relate to an optimal viewpoint. The transformed skeleton model is then processed by the neural network to recognise and identify an action being performed by a subject.

As shown in FIG. 2 there is a shown a schematic diagram of a computing apparatus configured to implement the action recognition method. The computing apparatus 100 is arranged to be implemented as part of the action recognition system. The terms computer/computing system, computer server and computer may all be interchangeably used to define the computing apparatus 100. As shown in FIG. 2, the action recognition system 200 further includes an image capture device 201. The image capture device 201 is a camera configured to capture images (or record a video) of the subject 10. In one example the system 200 may comprise multiple image capture devices configured to capture multiple images i.e., a video stream of a subject performing an action. The camera 201 may be integrated into the computing apparatus 100 or may be remote to the computing apparatus 100.

In this embodiment comprises a server 100 which includes suitable components necessary to receive, store and execute appropriate computer instructions. The components may include a processing unit 102, including Central Processing United (CPUs), Math Co-Processing Unit (Math Processor), Graphic Processing United (GPUs) or Tensor processing united (TPUs) for tensor or multi-dimensional array calculations or manipulation operations, read-only memory (ROM) 104, random access memory (RAM) 106, and input/output devices such as disk drives 108, input devices 110 such as an Ethernet port, a USB port, etc. The computing apparatus 100 comprises a user interface 112. The user interface may be configured to present information to a user. The user interface may also be configured to receive inputs or data from a user. In one example the user interface may comprise a display 112 such as a liquid crystal display, a light emitting display or any other suitable display. The user interface 112 may further comprise a combination of a display and buttons or switches. For example, the user interface may also comprise a keypad or a keyboard. In one example the user interface may comprise a touchscreen that is configured to present information to a user and receive inputs from a user.

The computing apparatus 100 i.e., server may include instructions that may be included in ROM 104, RAM 106, or disk drives 108 and may be executed by the processing unit 102. There may be provided a plurality of communication links 114 which may variously connect to one or more computing devices such as a server, personal computers, terminals, wireless or handheld computing devices, Internet of Things (IoT) devices, smart devices, edge computing devices. At least one of a plurality of communications link may be connected to an external computing network through a telephone line or other type of communications link. The communication links 114 may also comprise one or more short range communication modules such as for example a Bluetooth module. The computing apparatus 100 may be configured to receive and transmit data using Bluetooth or another suitable short range communication protocol via the communications link 114. For example, the computing apparatus 100 may receive images (or video) from the image capture device via Bluetooth.

The server 100 may include storage devices such as a disk drive 108 which may encompass solid state drives, hard disk drives, optical drives, magnetic tape drives or remote or cloud-based storage devices. The server 100 may use a single disk drive or multiple disk drives, or a remote storage service 120. The server 100 may also have a suitable operating system 116 which resides on the disk drive or in the ROM of the server 100. The computing apparatus may store one or more training data sets on one or more of the storage devices. The one or more training data sets may be used to re-train a neural network that may be executed by the processor of the computing apparatus to identify an action from a set of images or from a recorded video stream of the subject.

The computer or computing apparatus may also provide the necessary computational capabilities to operate or to interface with a machine learning network, such as a neural network, to provide various functions and outputs. The neural network may be implemented locally, or it may also be accessible or partially accessible via a server or cloud-based service. The machine learning network may also be untrained, partially trained or fully trained, and/or may also be retrained, adapted, or updated over time.

In this embodiment, the system for action recognition comprises a view adaptive neural network that is implemented by the computing apparatus 100 i.e., computing server 100. The view adaptive neural network may be a view adaptive graph neural network that is configured to dynamically determine an observed view and transform the skeleton view based on the determined view. The neural network then uses the skeleton to classify an action and identify an action based on the classification.

Figures 3A, 3B:
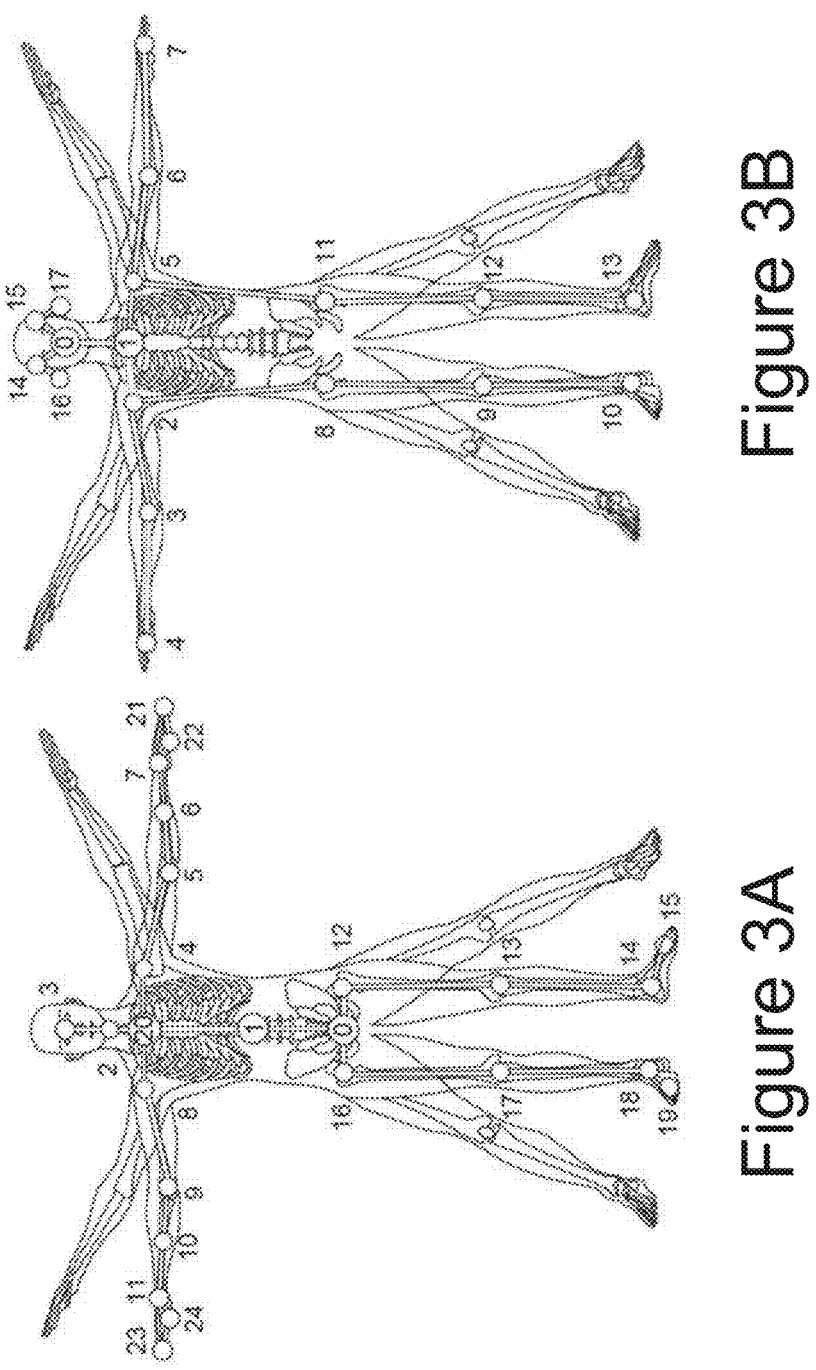
FIG. 3A shows examples of commonly used skeleton models that resolve a human body into nodes that represent joints and lines that represent limbs.
FIG. 3B shows other examples of commonly used skeleton models that resolve a human body into nodes that represent joints and lines that represent limbs.

Graph neural networks are commonly used to model human skeleton data. Graph neural networks (GNN) are used in action recognition techniques. GNNs defines a human body as a skeleton, wherein joints are defined as nodes and bones are defined as edges. A human body i.e., the subject's body is resolved into a skeleton model with joints being represented as nodes and limbs being represented by lines. FIGS. 3A, 3B each show an example of a skeleton model that is derived to represent a human body. FIG. 3A illustrates a first example of a skeleton model. The model shown in FIG. 3A is the NTU-RGB-D-60 model that includes 25 joint labels. FIG. 3B illustrates a second example of a skeleton model. The model shown in FIG. 3B is the Kenetics Skeleton 400 dataset model that includes 18 joint labels. In both FIGS. 3A and 3B the joints are numbered as illustrated. The present invention as part of the action recognition method utilises one of the skeleton models of FIG. 3A or 3B to represent a subject. Alternatively, other skeleton models may be used.

Figure 4:
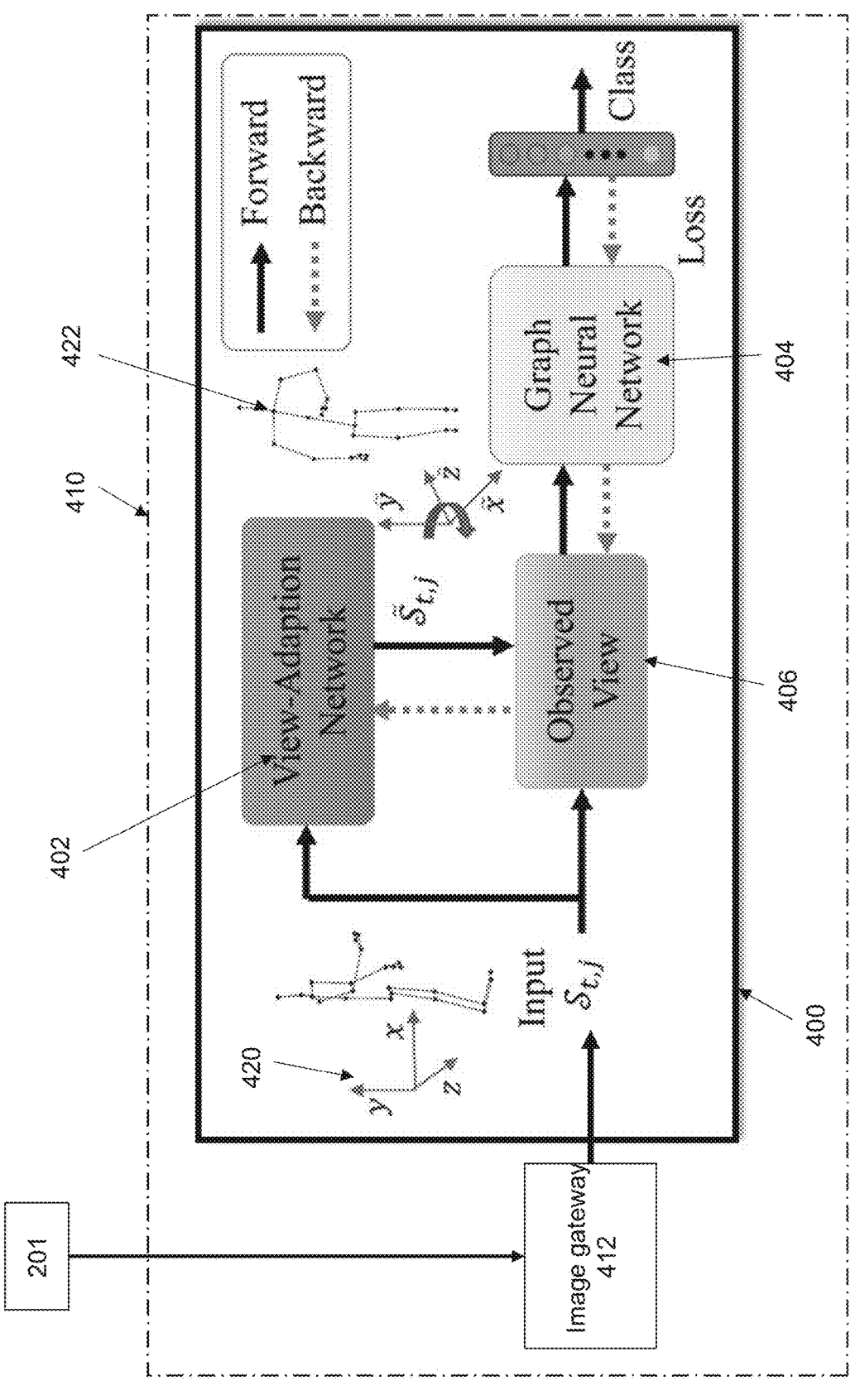
FIG. 4 shows a block diagram of the action recognition engine architecture, wherein the engine uses a view adaptive graph neural network.

FIG. 4 shows an example of an action recognition engine 410 architecture that is implemented by the computing apparatus 100. The engine 410 comprises the view adaptive neural network 400 that is implemented and executed by the computing apparatus 100. The neural network 400 comprises a view adaption block 402 (i.e., a view adaption module or view adaption network) and a graph neural network 404. The view adaption block may be a neural network or layered processing block. The neural network 400 further includes an observed view block 406. As shown in FIG. 4, the observed view block 406 receives data from the view adaption block and passes this data to the graph neural network 404. The view adjusted neural network 400 is implemented by the processor 102 of the computing apparatus 100. The processor is programmed to implement the network 400. The processor 102 is preferably a hardware processor.

In one example the view adaption block 402 (i.e., view adaptive block) is part of a neural network that comprises the view adaption block and the graph neural network together. In the illustrated examples a view adjusted neural network 400 comprises both the view adaption block 402 and the graph neural network 404. In another example the view adaptation network 402 may be in the form of a separate neural network. This separate view adaption block 402 may be arranged in communication with the graph neural network 404. The view adjusted neural network 400 (including the view adaption block 402 and the graph neural network may be implemented as software i.e., defined as executable instructions stored in a memory unit e.g., RAM or ROM. The instructions are executable by the processor.

In a further example configuration, the view adaption block 402 and the graph neural network may each be implemented on separate processors or integrated circuits. These separate processors may form part of the processor 102.

The network 400 is defined in an action processing engine 410. The view adaptive network 400 may form part of an action processing engine. The action processing engine is executed by the processor. The action processing engine 410 comprises an image gateway 412. The image gateway receives images from a camera. The image gateway 412 is configured to generate a wire three-dimensional skeletal model of the subject identified within the one or more input images. The action processing engine 410 further comprises the view adaption block 402 and the graph neural network 404. The observed image block 406 may also form part of the action processing engine 410. The view adaption block 402 is configured to automatically determine the observation viewpoint for each image or each video frame received and transform the skeleton model. The graph neural network 404 is configured to process the transformed skeleton model and identify an action being performed.

FIG. 4 illustrates operation of the action recognition system 200. FIG. 4 also illustrates the action recognition method. During operation the action processing engine 410 is configured to process images and determine an action being performed by the subject. The image gateway 412 is configured to receive images (or receive a video stream) of a subject performing an action from an image capture device 201. The images or video stream represent an action sequence being performed by the subject. As shown in FIG. 4 the solid lines denote forward, which relates to the flow of data. The dotted lines denote backward that denotes error or loss of data that is passed through the blocks again to reclassify an action. Optionally erroneous data may be deleted.

As shown in FIG. 4 the image gateway 412 is configured to extract each image (or each frame) and transmit this as an input to the view adaption block 402. The 3D skeleton model

422 is defined in a coordinate system 420. The coordinate system defines x, y and z positions of joints and limbs of the skeleton model. FIG. 4 illustrates the coordinate system 420. The coordinate system may be cartesian coordinate system. Alternatively, a polar coordinate system may be used.

During operation the processor 102 is configured to determine an observation viewpoint for each image. The processor 102 is further configured to apply a transform to the skeletal model based on the identified viewpoint. The processor 102 is configured apply a transformation function that defines parameters related to an optimal viewpoint. The transformation function, when executed by the processor 102, transforms each coordinate of the skeletal model and/or the coordinate system defining the position of the skeleton model. The transform is based on the transformation function. The view adaption block is configured to execute the processes of determining the best viewpoint and applying a transform to the skeleton model. The processor is configured to repeatedly, for each image of the one or more images (or at least for each frame), determine an observation viewpoint for each image and transform the skeletal model based on the identified viewpoint. The observation viewpoint (i.e., observed viewpoint) corresponds to the transformation of the skeleton model to a new coordinate system. This occurs adaptively.

The skeleton model is fed into the view adaption block 402. The view adaption block 402 is configured to calculate the observed view dynamically and turns the original skeletal input into new viewpoints for classification by the graph neural network 404. The view adaption block 402 may a linear layer. The view adaption block 402 is configured to apply an unsupervised learning algorithm to learn the best viewpoint. The view adaption module 402 is preferably trained to learn and determine observation viewpoints.

The transformation function comprises a transformation matrix and a translation vector. The transformation matrix defines a plurality of transformation values. At least one transformation value corresponds to a transformation of x coordinates of the skeleton model, at least one transformation value corresponds to a transformation of y coordinates of the skeleton model, and at least one transformation value that corresponds to a transformation value of z coordinates of the skeleton model.

The view adaptive block 402 is configured to learn the bests observed viewpoints and provide a transformed skeleton model 422 of the recorded sequence in an unsupervised manner. In one example implementation the skeleton joint as $S_{t,j}$ for the $j^{th}$ skeleton joint in the $t^{th}$ frame as follows:

$$S_{t,j} = [x_{t,j}, y_{t,j}, z_{t,j}]^T \in Q \qquad (1)$$

where $t \in (1, \ldots, \mathcal{F})$, $j \in (1, \ldots, J)$. $\mathcal{F}$ is the total number of frames, and J shows the total number of joints in the skeleton, which is determined by the skeleton estimation algorithm (FIG. 3). The joint $S_{t,j}$ contains three components, i.e., coordinate values x, y, z, at the time t for the joint j. The original coordinate space is defined as Q as $S_{t,j} \in Q$. The input skeleton sequence S is sensitive to view variations, as illustrated in FIG. 4. The network 400 is configured to transform the skeleton model (i.e., sequence) to $\tilde{S}_{t,j} = [\tilde{x}_{t,j}, \tilde{y}_{t,j}, \tilde{z}_{t,j}]^T$ by a view transformation expressed in view adaption block 402 as follows:

$$\tilde{S}_{t,j} = \mathcal{T} S_{t,j} \qquad (2)$$

13 where $$\mathcal{T} = (\mathcal{R}_x^{t,\alpha}, b_t)(\mathcal{R}_y^{t,\beta}, b_t)(\mathcal{R}_z^{t,\gamma}, b_t),$$

is the transformation function, $$\mathcal{R}^t = [\mathcal{R}_x^{t,\alpha}, \mathcal{R}_y^{t,\beta}, \mathcal{R}_z^{t,\gamma}] \in \mathbb{R}^{3\times3}$$

is the transformation matrix i.e. the rotation matrix, and $b \in \mathbb{R}^3$ is the translation vector. The transformation function is used to transform the skeleton model such that it corresponds to an observed view.

$$\mathcal{R}_x^{t,\alpha}$$

denotes the rotation of the original x-coordinate around the x-axis by $\alpha$ radians as follows:

$$\mathcal{R}_x^{t,\alpha} = \begin{bmatrix} 1 & 0 & 0 \\ 0 & \cos\alpha_t & -\sin\alpha_t \\ 0 & \sin\alpha_t & \cos\alpha_t \end{bmatrix}. \tag{3}$$

Similarly, the rotation matrix $$\mathcal{R}_y^{t,\beta} \text{ and } \mathcal{R}_z^{t,\gamma}$$

are defined as follows:

$$\mathcal{R}_y^{t,\beta} = \begin{bmatrix} \cos\beta_t & 0 & \sin\beta_t \\ 0 & 1 & 0 \\ -\sin\beta_t & 0 & \cos\beta_t \end{bmatrix}, \tag{4}$$

$$\mathcal{R}_z^{t,\gamma} = \begin{bmatrix} \cos\gamma_t & -\sin\gamma_t & 0 \\ \sin\gamma_t & \cos\gamma_t & 0 \\ 0 & 0 & 1 \end{bmatrix}. \tag{5}$$

The transformation matrix (i.e., the rotation matrix) defines transformation values for each coordinate to be transformed to a new coordinate space that corresponds to the identified observation viewpoint.

All the skeleton joints in the $t^{th}$ frame share the same parameters $(\alpha, \beta, \gamma, b)$ for transformation because the change in the viewpoint is a rigid motion. Thus, the original space Q is transformed into a new space $\tilde{Q}$ by combining the learned variations using parameters in values $\tilde{x}, \tilde{y}, \tilde{z}$ with t and j. For different images (i.e., different frames), the viewpoints can change across time. The processor is configured to preserve many relative rotations amongst the original skeleton. These rotations i.e., transformations may be stored in a memory unit or a database or another appropriate data storage structure. The transformation of the skeleton model addresses the problem of variation in the viewpoint of the skeleton during the training of the network 400 dynamically.

The view adaption module 402 is configured to automatically learn and determine the observation viewpoints with the transformation parameters $\alpha_t, \beta_t, \gamma_t, b_t$ as described earlier. The graph neural network 404 i.e., the GNN module 404 is configured to learn the temporal dynamics from the adopted skeleton data to recognize the human action in an end-to-end manner.

The observation can be considered skeleton's repositioning, which is characterized by rotation and translation. The repositioning comprises transforming the skeleton model based on the determined transformation function as described earlier. The graph neural network 404 is configured to obtain individual $t^{th}$ image i.e. $t^{th}$ frame from the sequence (i.e. recorded images), with the skeleton $\tilde{\delta}_{t,j}$ individual $t^{th}$ frame from the sequence, with the skeleton $\tilde{\delta}_{t,j}$ key parameters $\alpha_t, \beta_t, \gamma_t$ and obtain the rotation matrix $\mathcal{R}^t$ key parameters $\alpha_t, \beta_t, \gamma_t$ and obtain the rotation matrix $\mathcal{R}^t$ and the translation vector $b_t$. These parameters are learned by using the linear layer structure of the view adaption block. The parameters are leaned using an unsupervised algorithm (i.e., without direct supervision for $\alpha_t, \beta_t, \gamma_t, b_t$). The parameters of the rotation matrices are learned by applying a learning algorithm. The learning algorithm is based on a learning function. The learning function comprises:

$$[\alpha_t, \beta_t, \gamma_t]^T = \mathcal{W}_r k_t^r + c_r, \tag{6}$$

where $\mathcal{W}_r \in \mathbb{R}^{3\times n}$ denotes the weight matrix, $$k_t^r \in \mathbb{R}^{n\times1}$$

is a vector of the linear layer of the output with n number of neurons, and $c_r \in \mathbb{R}^{3\times1}$ is an offset (a bias) vector of the linear layer. $\mathcal{R}^t$ is obtained with the parameters learned using (2). The part of the translation parameters also consists of a linear layer and calculated as follows:

$$b_t = W_b k_t^b + c_b, \tag{7}$$

where $W_b \in \mathbb{R}^{3\times n}$ denotes the weight matrix, $$k_t^r \in \mathbb{R}^{n\times1}$$

is the output vector of the layer, and $c_b \in \mathbb{R}^{3\times1}$ is the offset vector.

The graph neural network 404 is configured recognize actions from the transformed skeleton model 422 that is received from the view adaption block 402 (i.e., view adaption block). The learned features are classified using traditional linear layer.

Graph neural networks (GNNs) have been used to model human skeleton data. The GNN treats human joints as nodes and bones (i.e., limbs) as edges of a graph. The human body joints as nodes and bones as edges denote the relationship representing the spatial graph as an adjacency matrix. This kind of graph is naturally defined based on the human body structure.

Optionally, the graph neural network may use a multistream ensemble with the data about joints and bones to improve performance.

The graph neural network 404 is configured to receive the transformed skeleton model 422. The transformed skeleton model is used to identify an action. The step of processing the skeleton model to identify an action further comprises the additional steps of: converting the transformed skeleton model, of each image, into a graph representation, and processing each graph representation to identify an action. The graph neural network 404 is configured to perform the above steps as part of processing the transformed skeleton model 422.

The graph neural network 404 is configured to represent each set of joints of the skeleton model as a total number of nodes within the graph representation. The graph neural network is configured to apply a graph convolution to each node within the graph representation. The graph neural network is configured to transform node representations to a learnable parameter matrix. During operation the graph neural network is configured to apply a non-linear ReLU function to the transformed node representations. The graph neural network 404 is then configured to process each graph representation that comprises identifying relationships between two or more nodes that represent joints in the skeleton model. The graph neural network 404 is configured to determine an action based on the relationship between the two or more nodes.

In one example implementation the transformed skeleton for the sequences $\tilde{S}_{t,j}$ is obtained from the view adaption block. The transformed human skeleton $\tilde{S}_{t,j}$ is then converted into graph representation: where $\mathcal{N} = \{n_1, \ldots, n_J\}$ is the set joints as the total J nodes, and $\varepsilon$ represents edges, which are the connectivity of joints, within the graph neural network 404. The graph neural network is further configured to apply the $1^{th}$ graph convolution to $J^{th}$ node in two steps: (a) The node representations are transformed to learnable parameter matrix $W_{G_\delta} \in \mathbb{R}^{(l+1) \times l}$; (b) These transformed nodes are collected to $n_J$ node with respect to the neighbouring nodes and followed by nonlinear ReLU function ($\sigma$). If node representations are contained in the matrix $\mathcal{X}^l \in \mathbb{R}^{l \times J}$, then the convolution operation is expressed as follows:

$$X^{(l+1)} = \sigma(W_{G_\delta} X^{(l)} A'),$$ (8)

where $A' \in [0,1]^{J \times J}$ is the symmetric adjacency matrix of graph $G_\delta$. The representation of skeleton data as graph adjacency A' is normalised using the regularised sparse matrix [42] as follows:

$$A' = (D_\tau)^{-1/2} A (D_\tau)^{-1/2},$$ (9)

where A is the basic adjacency matrix. $D_\tau = D + \tau I$, in which D represents the degree matrix with constant $\tau$, and I represents the identity matrix.

Figure 5:
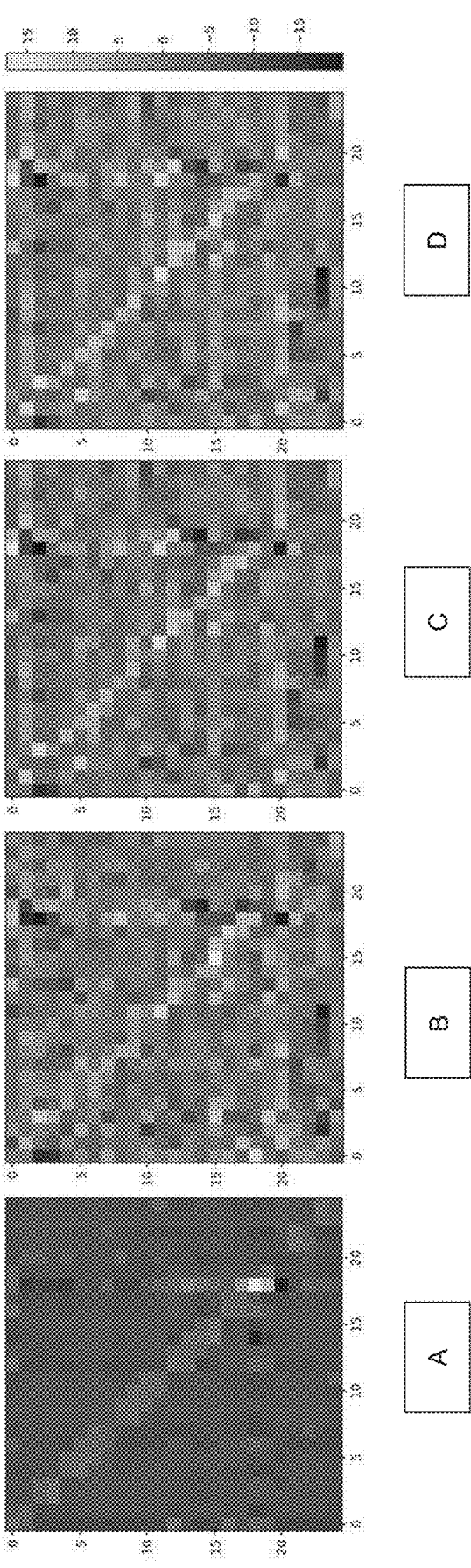
FIG. 5 illustrates an example visualization of the graph created from the skeleton model and a visualization of the adjacency matrix in use.

FIG. 5 illustrates an example visualization of the graph created from the skeleton model. FIG. 5 represents visualization of the adjacency matrix. FIG. 5 illustrates graph representations of the skeleton model joints and limbs. At different number of epochs, the graph neural network or at least a block of the graph neural network learnt different weights for the graph during the training process. FIG. 5 shows four different representations of weighting learnt in relation to the joints and limbs of the subject. The x axis and y axis represent nodes on the human body. For the example visualization in FIG. 5 the numbers represent the following nodes (i.e., features of the skeleton model) 0. Pelvis, 1. Thorax, 2. Neck, 3. Head, 4. L-Shoulder, 5. L-Elbow, 6.

L-Wrist, 7. L-Hand, 8. R-Shoulder, 9. R-Elbow, 10. R-Wrist, 11. R-Hand, 12. L-Hip, 13. L-Knee, 14. L-Ankle, 15. L-Feet, 16. R-Hip, 17. R-Knee, 18. R-Ankle, 19. R-Feet, 20. Spine, 21. L-Hand Fingers, 22. L-Thumb, 23. R-Hand Fingers, 24. R-Thumb. The graph conversations of skeleton model e.g., as illustrated by the example of FIG. 5, are used to identify the position of the nodes. These positions are used to identify an action based on a learned relationship of the position of the nodes and a corresponding action.

Referring to FIG. 5, The first image A shows the epoch 10 graph structure, which is very similar to the natural connectivity of the human body, and the self-connections have the highest weights. After several epochs of training, the adjacency matrix is adaptively changed by the AGCN block. This learned adjacency matrix would be much better than the physically defined adjacency matrix because it adaptively changes the weights to represent the relationship of the learned features of nodes The graph neural network 404 is trained prior to operation using one or more data sets that comprise images (or a video stream) of a subject performing various actions. The graph neural network is trained to recognize multiple different actions performed by a subject.

The graph neural network 404 further comprises a learnable weight matrix $M \in \mathbb{R}^{J \times J}$. The learnable weight matrix is utilised by the graph neural network 404 to learn a unique topology for each sample and improve the flexibility of the graph. Thus, equation defining the convolution transform is further transformed as follows:

$$x^{(l+1)} = \sigma(W_{G_\delta} x^{(l)} A' \odot M)$$ (10)

The second element M is also $J \times J$ adjacency matrix. Compared with A', the M factor is parametrised and optimised along with other parameters in the training process. The value of M has no limitations.

In particular, the graph neural network is trained based on input training data $(\tilde{S}_{t,j})$. The graph may be fully learned by the input training data. The graph neural network is configured to learn graphs that are entirely targeted for action recognition, in data-driven manner. In one example the graph neural network 404 uses the relevance of the relations between two joints and the strength of the connections by adding edges adaptively. The graphs are processed, and an action is identified.

The identified action is classified using the classifier block 424. The classifier block 424 outputs the identified action. The classified block 424 may be implemented as part of the graph neural network or may be a separate module.

The processor 102 is configured to implement the classifier block 424 and is configured to perform the functions.

Figure 6:
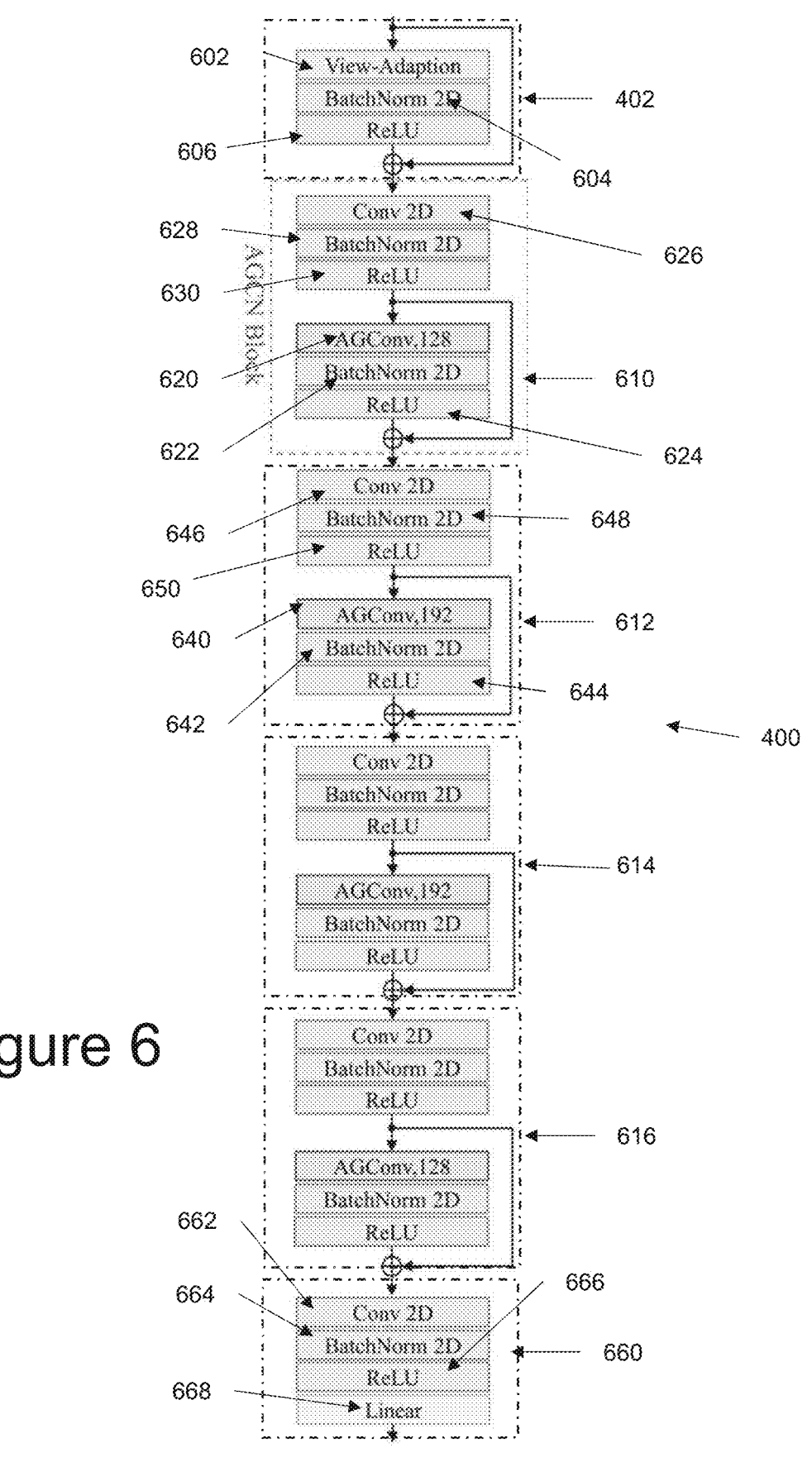
FIG. 6 illustrates an architecture of the view adaptive neural network and each of its components.

The architecture of the action recognition engine 410 contains the view adaptive neural network 400. The view adaptive network 400 comprises the view adaption block 402 (i.e., the view adaption block) that is configured to observe the human body skeleton from the best-viewed variations within the sequences, followed by the graph neural network 404. The graph neural network comprises a plurality of graph convolution blocks. The view adaption block may also comprise one or more data processing modules (i.e., data processing blocks). FIG. 6 illustrates an example the view adaptive network 400 architecture. FIG. 6 illustrates details of the blocks that form each component of the view adaptive neural network. FIG. 6 provides a visualisation of the view adaptive neural network 400 and the details of each component of this network.

Referring to FIG. 6, the view adaption block 402 comprises at least view adaption block 602, that is coupled to a batch normalisation block 604 followed by rectified linear unit (ReLU) 606. Image data, in particular skeleton model data from each image is received at the view adaption block 602. The view adaption block is configured to apply the transformation function to transform the skeleton model. The batch normalisation block 604 is configured to normalize the output from the block 602. The ReLU block is configured to apply an activation function. The output of these 3 blocks is a transformed skeleton model based on the transformation function described earlier.

In one example configuration the graph neural network 404 comprises; at least a first adaptive convolution block and at least a second adaptive convolution block. The first adaptive convolution block comprises at least a 2D convolution layer, a first batch normalisation layer, and a first rectified linear unit activation layer, a graph convolution block with 128 channels, wherein the graph convolution block with 128 channels is followed by a second batch normalisation layer and a second rectified linear unit activation layer. The second adaptive convolution block comprises at least a 2D convolution layer, a first batch normalisation layer, and a first rectified linear unit activation layer, a graph convolution block with 192 channels, wherein the graph convolution block with 192 channels is followed by a second batch normalisation layer and a second rectified linear unit activation layer.

FIG. 6 shows an example configuration of the graph neural network 404. Referring to FIG. 6, the graph neural network 404 comprises multiple blocks. The graph neural network 404 comprises four adaptive graph convolution blocks (i.e., residual blocks) 610, 612, 614, 616. Each residual block is an adaptive graph convolution block. The graph convolution blocks handle the spatiotemporal data i.e., the skeleton model data over a period of time. As shown in the example of FIG. 6, each residual block comprises a handle layer as a baseline. Each adaptive graph convolution block 610, 612, 614, 616, comprises an adaptive graph convolution layer with 128 or 192 channels.

As shown in FIG. 6, the first adaptive graph convolution block 610 comprises an adaptive graph convolution layer 620 having 128 channels. The block 610 further comprises a 2D batch normalisation layer 622 following the layer 620, followed by a rectified linear unit 624 (ReLU 624). The ReLU 624 is configured to implement an activation function. The first block 610 further comprises a 2D convolution layer 626, followed by a further 2D batch normalisation layer 628 and a ReLU layer 630.

Referring to FIG. 6, the second adaptive graph convolution block 612 comprises an adaptive graph convolution layer 640 having 192 channels. The block 612 further comprises a 2D batch normalisation layer 642 following the layer 640. The block 614 further comprises a rectified linear unit 644 (ReLU 644). The ReLU 644 is configured to implement an activation function. The second block 612 further comprises a 2D convolution layer 646, followed by a further 2D batch normalisation layer 648 and an ReLU layer 650.

The third adaptive graph convolution block 614 comprises a similar structure as the second block 612. The block 614 includes 192 channels within its adaptive graph convolution layer. The fourth adaptive graph convolution block 616 is similar in structure to the first block 610 and comprises 128 channels.

The view adaptive network 400 further comprises an output block 660. The output block 660 may function as the classifier shown in FIG. 4. The output block may comprise at least a 2D convolution layer 662, followed by a batch normalisation layer 664, followed by an ReLU 666. The output block 660 may further comprise linear layer 668 that is configured to output a classification score. The classification scores may be output onto a display 112 of the computing apparatus 100. The classification score may be utilised by the processor to recognise and identify a particular action. The recognised action may be presented on the display 112. Additionally, or alternatively, the identified action may be presented as an audible message or a visual message or a combination of an audible and visual message.

Except for the first block, all graph convolution blocks down-sample the temporal dimension with stride of 2 in temporal convolution operation by Conv 2 layer and sliding window. Five residual connections between the layers are added to facilitate the training and prevent overfitting in the action recognition method.

The described action recognition system 200 was tested on test data. In particular, the view adaptive network 400 design as described, and the action recognition method as described was tested on three benchmark datasets. These test data sets were NTU RGB+D-60 (NTU60), NTU RGB+D-120 (NTU120), Kinetics-Skeleton 400 (KS400). The method and network 400 were also tested on an Unmanned Aerial Vehicle-Human 155 data set.

Details of the datasets are provided below.

NTU60: The NTU60 is a laboratory posed dataset, captured using the Kinect sensor, is currently the largest dataset with RGB and depth video and skeleton data for human action recognition. It contains 60 human action categories that reflect daily actions, medical conditions and two-person interactions with joint actions. Each human skeleton has 25 joint positions on important locations on the body part. Different camera setups, viewpoints and angle orientations of the subjects result in various samples. The two standard protocols, cross view (CV) and cross subject (CS), are used to collect the dataset. For CV, three camera positions are used to capture the samples. Camera-2 and camera-3 are used for the training, whereas camera-1 is used for the testing set. For CS, 40 subjects are split into training and testing groups. The difference in camera views, multiple subjects and video samples makes this dataset challenging for action recognition.

NTU120: The NTU120 dataset extends NTU60 with an additional 60 action classes. The 106 subjects are captured using 32 different camera setups. The total number of skeleton sequences is increased to 114,480 samples by adding 57,600 videos. Two different protocols are used for evaluation purposes. The first is cross setup (CX), which replaces CV, and the second is CS. In the CX protocol, 55,003 video samples from half of the camera settings are used for training, and 59,477 video samples from the rest of half camera setup are selected for testing. In the CS protocol, 63,026 video samples from 53 subjects are used for training purposes, and the rest of the 51,454 videos from 67 subjects are kept for testing.

KS400: The Kinetics-Skeleton dataset is obtained from the kinetics video action recognition dataset by employing the OpenPose human pose estimation. The video clips are from YouTube and depict a variety of human actions. This dataset contains 400 action classes with 240,436 training and 19,796 testing sequences. Each skeleton contains a 2D spatial coordinate position of 18 body points along with the confidence score. The skeletons with low confidence levels are discarded. A maximum of two skeletons are kept in the are discarded. A maximum of two skeletons are kept in the video sequences. Given the limitation of not having the third-dimension information for this dataset, we employed homogeneous coordinates representation as w=1 to add a third coordinate to every 2D point.

UAV-H155: UAV-Human 155 dataset is collected for the purpose of developing human behaviour understanding and surveillance in the wild. It provides video sequences for subject analysis such as action recognition, attribute evaluation, pose estimation, and so on. During the acquisition of this dataset, 45 sites with a variety of locations and weather conditions were chosen at a flying height of 2-8 meters using multiple sensors such as night vision, fisheye, and azure DK. In total, 22,476 video sequences with 119 subjects and 155 action classes in 6 modalities are available. These video sequences also include 17 major skeleton joints. Human actions are classified into the following categories: daily activities, productive work, violent activities, social activities, productive work, violent activities, social interaction, life-saving gestures, and UAV control gestures. Two benchmarks for evaluation of human action recognition are defined as cross subject version 1 (CS-1) and cross subject version 2 (CS-2) protocol which includes 89 subjects for training and 30 subjects for testing.

Table 1 below summarises the characteristics of the experimental data.

TABLE I

CHARACTERISTICS OF EXPERIMENTAL DATA

| Dataset | Subject | No. of Markers | Videos | Action |
|---|---|---|---|---|
| NTU60 | 40 | 25 | 56,880 | 60 |
| NTU120 | 106 | 25 | 114,480 | 120 |
| KS400 | — | 18 | 260,232 | 400 |
| UAV-H155 | 119 | 17 | 22,476 | 155 |

The view adaptive network 400 was trained using the experimental data. The training and validation computations are performed on two Nvidia GTX 1080 graphic processing units, 64 GB RAM and Intel Core i7-7800x CPU at the rate of 3.50 GHz12x processors. The models were trained using a stochastic gradient with a momentum of 0.9 as an optimisation strategy. The batch size is 16 for training and 32 for testing, with cross-entropy as the loss function. The weight decay rate is 0.0005. A batch size of 128 is used for training, and 256 is used for testing in the KS400 dataset.

The current action recognition system 200 that utilises the view adaptive network 400 was compared with current pre-processing approaches that use human defined criteria to address the problems with view variation. The view adaptive network 400 uses the view adaption block that transforms the skeleton model based on a determined observation viewpoint resulted in the highest accuracy.

The performance of the network 400 was tested with the view adaptive block (VA block), pre-processing (P) method and without VA block. For a fair comparison, two state-of-the-art methods were also implemented, A-GCN and G3D, and tested the performance with and without a pre-processing method. The current network model 400, VA-GNN-P with pre-processing method improves the recognition accuracy by +2.74% from the base model of the network 400 without VA block (i.e., VA-GNN). The test with view adaptive block 402 (VA block) and the baseline GNN improves the accuracy by more than +1.87% in the CV protocol. The same pre-processing method as that used in A-GCN was applied. Using the same data protocol and the stated pre-processing techniques, the present designed view adaptive network (VA-GNN) outperforms A-GCN-P by +1.07% and G3D-P by +2.10%, as shown in Table II. The preprocessing strategy defined by humans is not optimum for action recognition. Given that the human body is non-rigid, defining rotation criteria is not always appropriate for orientation alignment. The presently described action recognition method uses a network trained by optimising classification accuracy to find the appropriate viewpoints automatically. As can be seen from table II the network 400 used in the present action recognition system and method performed with the highest accuracy.

TABLE II

COMPARISON OF PROPOSED VIEW-ADAPTIVE BLOCK AND PRE-PROCESSING METHOD ON THE NTU60 DATASET

| | Methods | CS (%) | CV (%) |
|---|---|---|---|
| w/o VA Pre-proc. | VA-GNN | 76.11 | 89.57 |
| | G3D-P | 81.15 | 92.08 |
| | A-GCN-P | 84.30 | 92.70 |
| | VA-GNN-P | 80.88 | 92.31 |
| w/o Pre-proc. | G3D | 74.57 | 86.89 |
| | A-GCN | 82.40 | 90.11 |
| | VA-GNN | 86.21 | 94.18 |

The VA module is part of our proposed recognition system. Its number of parameters is fewer than the number of parameters of the GCN part. The model can be built in two ways over the number of network parameters for the recognition: (1) stacking layers in GCN blocks and (2) increasing the number of neurons through the depth of layers in the GCN block. The A-GCN was used as a baseline network. Thus, the originally proposed A-GCN contains 10 numbers of GCN blocks. Therefore, the results when changing the number of layers in GCN blocks as AGC are illustrated below.

Table III shows the comparison between the GCN modules and the described VA block with a different number of stacking layers/blocks. The depth of the GCN blocks (i.e. graph convolution blocks 610-616), is 128, 192, 192 and 128 in width, impacting the performance by the number of parameters. However, it has been fixed for consistency after trials during experiments. Stacking many layers or utilising a great number of neurons to increase parameters is not as efficient as the approach of using the VA block 402 in a neural network design. Although the proposed model 400 as described herein has a small number of parameters, it outperforms the baseline model, demonstrating the effectiveness of VA block 402.

TABLE III

COMPARISON OF THE VIEW-ADAPTIVE LAYER AND DIFFERENT NUMBER OF GCN BLOCKS ON THE NTU60 DATASET

| Model | Module | No. Parms.(M) | CS (%) | CV (%) |
|---|---|---|---|---|
| VA-GNN | VA | 0.31 | 78.50 | 81.03 |
| | 1AGC | 0.63 | 79.22 | 84.33 |
| | 2AGC | 1.30 | 83.69 | 88.10 |
| | 3AGC | 1.97 | 85.11 | 91.83 |
| | 4AGC | 2.33 | 87.04 | 93.61 |
| | 5AGC | 2.98 | 86.48 | 89.27 |
| | 6AGC | 3.61 | 88.20 | 92.11 |
| | 10AGC | 5.96 | 89.01 | 92.70 |

The view adaptive network 400 was compared with various conventional approaches that use other types of graph neural networks (GNNs), convolution neural networks (CNNs) and Recurrent neural networks (RNNs. The test results of the various approaches on the experimental datasets are presented below in tables IV-VII.

For the NTU60 Dataset: the standard CS and CV protocol were used to assess the performance of the existing methods. The results are presented in Table IV. This dataset contains many variations in the view, complicating the action recognition. Compared with CNN-based methods, all methods using GNN have a much smaller model size and a slightly higher or similar accuracy. In the RNN category, VA-LSTM achieved high accuracy scores as compared to other RNN methods. This method is also based on the view adaption mechanism, but our VA-GCN outperforms VARNN by 6.8% and 6.6% on CS and CV settings, respectively. Most RNN-based methods do not perform well on the NTU60 dataset. In the GNN category, the VA-GNN 400 (i.e., view adaptive network as described above) outperforms RAGCN by 0.4% and 1.1% on CS and CV settings. Although A-GCN performs slightly better than the current action recognition method, the number of parameters of A-GCN is almost twice the number of the proposed network design of network 400 because of the referenced accuracy on joints and bones streams (2s) together. This makes the view adaptive network 400 more efficient and may provide for faster processing and faster action recognition. The results of the view adaptive network 400 (VA-GNN) is indicated in bold in the tables below.

TABLE IV

COMPARISON WITH THE EXISTING METHODS ON NTU-RGB-D-60 USING CROSS SUBJECT (CS) AND CROSS VIEW (CV) Protocols

| | | | No. Parms. | | NTU60 Accuracy | |
| Features | Methods | Year | (M) | Data | CS (%) | CV (%) |
|---|---|---|---|---|---|---|
| CNN | VI-CNN | 2017 | — | J.Skel. | 88.0 | 87.2 |
| | JEAs | 2019 | — | J.Skel. | 75.9 | 81.8 |
| | FI-CNN | 2021 | 22.4 | J.Skel. | 84.2 | 89.7 |
| RNN | PLSTM | 2017 | — | J.Skel. | 62.9 | 70.3 |
| | VA-LSTM | 2017 | — | J.Skel | 79.4 | 87.6 |
| | LSTMTG | 2018 | — | J.Skel. | 69.2 | 77.7 |
| | P&C | 2020 | — | J.Skel. | 50.7 | 76.1 |
| GNN | P-GCN | 2018 | — | J.Skel. | 87.5 | 93.2 |
| | STGR | 2018 | — | J.Skel. | 86.3 | 74.9 |
| | A-GCN | 2019 | 3.8 | 2s. | 90.0 | 96.2 |
| | SGN | 2020 | 0.7 | J.Skel. | 86.9 | 92.8 |
| | HGNN | 2021 | — | J.Skel. | — | 93.7 |
| | RA-GCN | 2021 | 2.0 | J.Skel. | 85.8 | 93.1 |
| | VA-GNN | — | 2.3 | J.Skel. | 86.2 | 94.2 |

For the NTU-RGB-D-120 Dataset: the standard CS and CX protocol was used. The results are presented in Table V. The dataset adds 60 more fine-grained action categories, increasing the difficulty of the task. Similarly, all GNN-based methods perform substantially better than CNN and RNN based methods. Compared with FI-CNN, our VA-GNN improves by 4.3% in CS and 4.4% in CX. Amongst all the GNN-based methods using single-joint skeleton information/stream, VA-GNN 400 (i.e., view adaptive network 400) achieves the state-of-the-art result, suppressing the semantic-guided network (SGN) by 1.7% in CS and 2.1% in CX and the RA-GCN by 0.9% in CS and 1.3% in CX although MS-G3D is 0.9% in CS and 1.3% in CX. Although MS-G3D is slightly better than the presently described action recognition method, it utilises two-stream information, which is not used in present invention. This makes the present invention more robust and simpler. The results of the view adaptive network 400 are presented in table V in bold.

TABLE V

COMPARISON WITH THE EXISTING METHODS ON NTU-RGB-D-120 USING CROSS SUBJECT (CS) AND CROSS SETUP (CX) PROTOCOLS

| | | | No. Parms. | | NTU120 Accuracy | |
| Features | Methods | Year | (M) | Data | CS (%) | CX (%) |
|---|---|---|---|---|---|---|
| CNN | RCMT | 2018 | — | J.Skel. | 62.2 | 61.8 |
| | FI-CNN | 2021 | 22.4 | J.Skel. | 74.8 | 76.9 |
| RNN | PLSTM | 2017 | — | J.Skel. | 25.5 | 26.3 |
| | LSTMTG | 2018 | — | J.Skel. | 55.7 | 57.9 |
| GNN | MS-G3D | 2020 | 3.2 | 2s. | 86.9 | 88.4 |
| | SGN | 2020 | 0.7 | J.Skel. | 77.4 | 79.2 |
| | RA-GCN | 2021 | 2.1 | J.Skel. | 78.2 | 80.0 |
| | VA-GNN | — | 2.6 | J.Skel. | 79.1 | 81.3 |

For the Kinetics Skeleton 400 Dataset: the VA-GNN 400, as described herein, achieves 32.9% top-1 accuracy and 57.5% top-5 accuracy. The summary of the results is presented in Table VI. The comparison of all the methods using single-joint skeleton information indicates that VA-GNN 400 is higher than actional-structural (AS) GCN by 1.0% and STGR by 1.4% in terms of top-5 accuracy. The performance of AGCN and hypergraph neural network (HGNN) is slightly better than that of the proposed VA-GNN 400. However, these two methods use two or three streams by leveraging additional information. However, these multi-stream methods lead to a considerable increase in the training and processing time and the number of parameters. The view adaptive network 400 (VA-GNN) does not include additional information. Hence, it is much lighter and faster than the multi-stream methods are in real-time applications. The performance of the described network is denoted by VA-GNN (ours)

TABLE VI

COMPARISON WITH EXISTING METHODS KINETICS SKELETON 400 USING TOP 1 AND TOP 5 ACCURACIES

| | | | | KS400 Accuracy | |
| Features | Methods | Year | Data | Top 1 (%) | Top 5 (%) |
|---|---|---|---|---|---|
| GCN | STGR [51] | 2018 | J.Skel. | 33.6 | 56.1 |
| | AS-GCN [37] | 2019 | J.Skel. | 34.8 | 56.5 |
| | A-GCN [32] | 2019 | 2s | 37.8 | 61.0 |
| | | | J-Skel. | 35.1 | 57.1 |
| | HGNN [36] | 2021 | 3s | 37.1 | 60.0 |
| | VA-GNN (ours) | — | J.Skel. | 32.9 | 57.5 |

For the UAV-Human Dataset: the described VA-GNN 400 attained 45.19% CS-1 accuracy and 73.18% CS-2 accuracy. The results are summarised in Table VII. The comparison with methods using single-joint skeleton information shows that our VA-GNN 400 outperformed the existing methods such as temporal enhanced (TE) GCN] and multi-stream spatiotemporal relative transformer (MSST-RT) by 2.7% and 4% respectively in CS-1 protocol. The performance of A GCN is degraded when it comes to the wild dataset because of large variations in the views. However, using multiple streams cannot handle the large variations in human skeletons. The comparison suggests that skeleton-based methods ST-GCN, Shift-GCN with pre-processing are limited in generalizability in terms of large variations. The results again show the improved performance of the view adaptive network 400 as described. The view adaptive network performance is shown in bold in table VIII

TABLE VII

COMPARISON WITH THE EXISTING METHODS
UAV-HUMAN 155 USING CS-1 AND CS-2 ACCURACIES

| Features | Methods | Year | Data | CS-1(%) | CS-2(%) |
|---|---|---|---|---|---|
| | | | | UAV-H155 Accuracy | |
| GCN | ST-GCN | 2018 | J.Skel. | 30.25 | 56.14 |
| | DGNN | 2019 | J-Skel. | 29.90 | — |
| | A-GCN | 2019 | 2s-Skel. | 34.84 | 66.68 |
| | Shift-GCN | 2020 | J.Skel. | 37.97 | 67.04 |
| | MSST-RT | 2021 | 2s.Skel. | 41.22 | — |
| | TE-GCN | 2021 | | 42.50 | 68.20 |
| | VA-GNN | — | J.Skel. | 45.19 | 73.18 |

The action recognition system and method utilise the view adaptive network 400 for action recognition. The network 400 uses a view adaption block 402 and a graph neural network 404 in combination. The network 400 as described can change the observation viewpoint to the appropriate one through an unsupervised approach instead of a human predefined criterion. The network transforms the skeleton model and repositions the skeleton for action recognition. The view adaption block 402 is advantageous because it transforms variations in the human body skeleton's viewpoints and eliminates the influence of diversity in views from camera positions. The adaptive graph neural network 404 eases the training and allows end-to-end learning of the best graph topology based on the input images (or video sequences). The proposed network 400 used in an action recognition method and system provides a more accurate method for action recognition. The described action recognition system and method, utilising network 400 also is more robust and can handle variations in view resulting in a more accurate action recognition. The use of the network 400 reduces computational loads. Further network achieves comparable performance as state-of-the-art approaches and, in many instances, better performance with reduced parameters. This structure of the network 400 is simpler to implement than some of the other state of the art methods. The network 400 can transform skeletons of distinct views into a considerably more consistent virtual perspective as opposed to the prior art pre-processing approach. The described action recognition system and method provides an improved solution.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components, and data files assisting in the performance of particular functions, the skilled person will understand that the functionality of the software application may be distributed across a number of routines, objects, or components to achieve the same functionality desired herein.

It will also be appreciated that where the methods and systems of the present invention are either wholly implemented by computing system or partly implemented by computing systems then any appropriate computing system architecture may be utilised. This will include standalone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An action recognition system for recognising actions performed by a subject, the action recognition system comprising:
   a computing apparatus comprising a processor, a memory unit, wherein the memory unit comprises a non-transitory computer readable medium comprising computer executable instructions stored thereon that, upon execution of the instructions by the processor, the processor configured to:
   receive one or more input images of a subject captured by an image capture device,
   generate a wire three dimensional (3D) skeletal model of the subject identified within the one or more input images,
   determine an observation viewpoint for each image,
   apply a transform to the skeletal model based on the identified viewpoint, and
   process the skeletal model to identify an actions;
   wherein the processor is further configured to repeatedly, for each image of the one or more images, determine an observation viewpoint for each image and transform the skeletal model based on the identified viewpoint;
   wherein the processor is configured to apply a transformation function that defines parameters related to an optimal viewpoint;
   wherein the transformation function, when executed by the processor, transforms each coordinate of the skeleton model and/or the coordinate system defining the position of the skeleton model, based on the transformation function, such that the skeleton model is arranged as viewed from an optimal viewpoint;
   wherein the transformation function comprises a transformation matrix and a translation vector, the transformation matrix defines a plurality of transformation values, wherein at least one transformation value corresponds to a transformation of x coordinates of the skeleton model, at least one transformation value corresponds to a transformation of y coordinates of the skeleton model, and at least one transformation value that corresponds to a transformation value of z coordinates of the skeleton model;
   and
   wherein the transformation function is defined as $$T = (\mathcal{R}_x^{t,\alpha}, b_t)(\mathcal{R}_y^{t,\beta}, b_t)(\mathcal{R}_z^{t,\gamma}, b_t),$$

wherein x, y, z correspond to coordinates, α=radians of x coordinate transformation, β=radians of y coordinate transformation and Y=radians of z coordinate transformation, wherein the transformation function defines the transformation for each image.

2. The action recognition system in accordance with claim 1, wherein the transformation matrix is defined as $$\mathcal{R}^t = [\mathcal{R}_x^{t,\alpha}, \mathcal{R}_y^{t,\beta}, \mathcal{R}_z^{t,\gamma}]$$

and wherein the translation vector is defined as b∈ $\mathbb{R}^3$.

3. The action recognition system in accordance with claim 2, wherein each joint of the skeleton model in each image shares the same transformation parameters, wherein the transformation parameters are defined as (α, β, γ, b).

4. An action recognition system for recognising actions performed by a subject, the action recognition system comprising:

a computing apparatus comprising a processor, a memory unit, wherein the memory unit comprises a non-transitory computer readable medium comprising computer executable instructions stored thereon that, upon execution of the instructions by the processor, the processor configured to:

receive one or more input images of a subject captured by an image capture device, generate a wire three dimensional (3D) skeletal model of the subject identified within the one or more input images, determine an observation viewpoint for each image, apply a transform to the skeletal model based on the identified viewpoint, process the skeletal model to identify an action, wherein the processor is configured to apply a transformation function that defines associated transformation parameters related to an optimal viewpoint;

wherein the processor is configured to automatically learn an optimal viewpoint when the processor executes the step of determining an observation viewpoint; and the processor further configured to automatically learning and determining an observational viewpoint with the associated transformation parameters, wherein the processor is configured to implement and execute a neural network, the neural network may be defined by the computer executable instructions stored in the memory unit, and wherein the neural network comprises a view adaption block, and the view adaption block is configured to apply an unsupervised learning algorithm as part of the step of learning an observation viewpoint with associated transformation parameters.

5. The action recognition system in accordance with claim 4, wherein the learning algorithm comprises applying a learning function to each of the received images.

6. The action recognition system in accordance with claim 5, wherein the learning algorithm comprises applying a learning function, the learning function comprises $$[\alpha_t, \beta_t, \gamma_t]^T = \mathcal{W}_r k_t^r + c_r,$$

wherein $\mathbb{R}_r \in \mathbb{R}^{3 \times n}$ denotes the weight matrix, $$k_t^r \in \mathbb{R}^{n \times 1}$$

defines a vector for the linear layer of the output with n number of neurons within the neural network and $c_r \in \mathbb{R}^{3 \times 1}$ defines an offset vector of the linear layer.

7. An action recognition system for recognising actions performed by a subject, the action recognition system comprising:

a computing apparatus comprising a processor, a memory unit, wherein the memory unit comprises a non-transitory computer readable medium comprising computer executable instructions stored thereon that, upon execution of the instructions by the processor, the processor configured to:

receive one or more input images of a subject captured by an image capture device, generate a wire three dimensional (3D) skeletal model of the subject identified within the one or more input images, determine an observation viewpoint for each image, apply a transform to the skeletal model based on the identified viewpoint, and process the skeletal model to identify an action by:

converting the transformed skeleton model, of each image, into a graph representation, and processing each graph representation to identify an action.

8. The action recognition system in accordance with claim 7, wherein the processor is configured to implement an adaptive convolution graph neural network, and wherein the steps of converting the transformed skeleton model into a graph representation and processing each graph representation is performed by an adaptive convolution graph neural network.

9. The action recognition system in accordance with claim 8, wherein the processor, as part of the step of converting the transformed skeleton into a graph representation, is further configured to execute computer readable instructions causing the processor to perform the additional steps of:

representing each set of joints of the skeleton model as a total number of nodes within the graphrepresentation, applying a graph convolution to each node within the graph representation by:

i) transforming node representations to a learnable parameter matrix defined as $W_{\mathcal{G}_\delta} \in \mathbb{R}^{(l+1) \times l}$, and ii) applying a nonlinear ReLU function (σ) to the transformed node representations, and processing each graph representation comprises identifying relationships between two or more nodes that represent joints in the skeleton model; and determining an action based on the relationship between two or more nodes.

10. The action recognition system in accordance with claim 9, wherein the convolution graph neural network further comprises:

at least a first adaptive convolution block; and at least a second adaptive convolution block, wherein the first adaptive convolution block comprises at least a 2D convolution layer, a first batch normalisation layer, and a first rectified linear unit activation layer, a graph convolution block with 128 channels, wherein the graph convolution block with 128 channels is followed by a second batch normalisation layer and a second rectified linear unit activation layer, and;

wherein the second adaptive convolution block comprises at least a 2D convolution layer, a first batch normalisation layer, and a first rectified linear unit activation layer, a graph convolution block with 192 channels, wherein the graph convolution block with 192 channels is followed by a second batch normalisation layer and a second rectified linear unit activation layer.

\* \* \* \* \*